United States Patent [19]

Stacher et al.

[11] Patent Number: 5,364,008
[45] Date of Patent: Nov. 15, 1994

[54] METHOD FOR TEMPERATURE MEASUREMENT INSIDE A RETORT

[75] Inventors: George W. Stacher, Westminister; Murray W. Mahoney, Camarillo, both of Calif.

[73] Assignee: Rockwell International Corporation, Seal Beach, Calif.

[21] Appl. No.: 45,289

[22] Filed: Apr. 12, 1993

[51] Int. Cl.$^5$ ............................................. B23K 20/14
[52] U.S. Cl. ................................... 228/103; 228/235.1
[58] Field of Search ................. 228/9, 44.3, 102, 103, 228/235.1

[56] References Cited

U.S. PATENT DOCUMENTS

| 3,408,728 | 11/1968 | Fickett et al. | 228/235.1 X |
| 3,547,599 | 12/1970 | Muser et al. | 228/193 X |
| 4,088,258 | 5/1978 | Regalbuto | 228/44.3 |
| 4,444,352 | 4/1984 | Glascock, II | 228/193 |
| 4,927,068 | 5/1990 | Naka et al. | 228/103 |

Primary Examiner—Kenneth J. Ramsey
Attorney, Agent, or Firm—Terrell P. Lewis; Charles T. Silberberg

[57] ABSTRACT

An apparatus and a method for measuring the temperature of a reactive metallic workpiece sealed within a retort prior to and during diffusion bonding of the workpiece. The apparatus includes temperature measuring instruments disposed adjacent preselected portions of the workpiece within the retort, thermal conducting means connecting the instruments with display devices located outside the retort, conduits coupled with the interior of the retort and with the display devices, each of the conduits including a first end portion communicating the interior of the retort with vacuum generating means and a second end portion including at least one tubular region through which the thermal conducting means pass to connect with the display devices, and means for sealing the first and second end portions to maintain an evacuated state within the retort after a vacuum is applied thereto. The method contemplates measuring the temperature at the preselected portions of the workpiece within the retort while conducting the diffusion bonding process and then using the measured temperatures to control the temperatures applied to and within the retort during subsequent diffusion bonding processes.

5 Claims, 2 Drawing Sheets

METHOD FOR TEMPERATURE MEASUREMENT INSIDE A RETORT

BACKGROUND OF THE INVENTION

1. Field of the Invention

The present invention generally relates to methods and apparatus for temperature measurement and control inside a container during a high temperature heating process, and more particularly to the measurement and control of temperatures within a sealed container or retort prior to and during diffusion bonding of a metallic sandwich structure.

2. Background of the Invention

A well-known technique for joining metal is diffusion bonding. This process involves metallurgically joining surfaces of similar or dissimilar metals by applying heat and pressure for a time duration so as to cause co-mingling of atoms at the joint interface.

In the diffusion bonding process, the application of pressure accomplishes a plastic flow of the material to fill normal void areas. If the pressure is too low, small voids will remain at the joint interface and the joint strength will be less than the maximum attainable. The application of pressure also breaks up the surface oxides and surface asperites so as to present clean surfaces for bonding.

The elevated temperatures used for diffusion bonding serve to accelerate diffusion of atoms at the joint interfaces as well as to provide a metal softening which aids in surface deformation thereby allowing more intimate contact for atom bonding and movement across the joint interface.

Through practice of this technique, It has become accepted that diffusion bonding of certain "reactive" metals, such as titanium and its alloys, must be conducted in a controlled environment In order to ensure cleanliness of the materials which are particularly sensitive to oxygen, nitrogen, and water vapor content in the air at elevated temperatures. Unless the metals are protected during this bonding process, they will become embrittled and their structural integrity will be destroyed.

The controlled environment has been attained through the use of a closed, sealed and evacuated metallic envelope known as a "retort". Typically, the retort is provided with external instrumentation for the purpose of monitoring the parameters of the diffusion bonding process. However, it has been found that, under these circumstances, exact measurement inside the retort of the temperatures of the components necessary for successful and repeatable diffusion bonding is not attainable.

Several approaches have been attempted to remedy this problem. At first, analytical modeling was employed using heat transfer calculations. Thereafter, more sophisticated approaches involved instrumenting a dummy part at preselected locations and comparing differences in temperatures between the part itself and locations that were previously monitored. This approach was based on the assumption that these differences were constant, so that, once determined, they would translate into temperature parameters which could be used to control the diffusion bonding process. However, too many extraneous and often unexpected conditions arose which interfered with accurate and repeatable measurements, thereby rendering this technique ineffective.

SUMMARY OF THE INVENTION

It is therefore a primary object of the present invention to provide a method and apparatus for performing diffusion bonding on reactive metallic materials, such as titanium and titanium alloys, in a controlled environment where the range of process control parameters is repeatable.

Another object of the present invention is to provide apparatus and a method for monitoring temperatures within a chamber heated to diffusion bonding temperatures without disturbing the chamber.

Another object of the present invention is to provide temperature monitoring apparatus for placement at selected locations about a workpiece secured within diffusion bonding tooling without disturbing the tooling once the latter is set up.

Yet another object of the invention is to provide an apparatus for making in-situ measurements of temperature within a sealed retort, without disrupting either the bonding process or the evacuated, controlled environment.

Still another object is to provide a method of measuring thermal control parameters for a workpiece within a sealed retort via strategically located measurement devices in a diffusion bonding processing chamber whereby thermal processing control parameters for subsequent diffusion bonding processes can be established.

Briefly, the invention includes a metallic container or "retort" enveloping a workpiece prepared for diffusion bonding and temperature measuring apparatus including thermocouple devices strategically placed at locations on or about the workpiece. The retort comprises upper and lower metal sheets which are to be sealed at edges about the workpiece. Vacuum lines, connected to the chamber formed between the, upper and lower sheets within which the workpiece is contained, also carry leads from the thermocouple devices to temperature display and recording apparatus located outside the retort. Thereafter, the vacuum line entry points for the thermocouple leads are sealed to prevent ingress of contaminants into the retort during the diffusion bonding process. The temperatures on or about the workpiece are measured during the course of the diffusion bonding process, and the relationship between the time over which the temperature is elevated and the temperatures at the specified locations is determined. This relationship is then used in the current process, as well as in subsequent processes, to control both the external temperature to which the retort is subjected (for elevating the workpiece to the target temperature) and the time at which the specified temperature is to be applied.

BRIEF DESCRIPTION OF THE DRAWINGS

Other objects and advantages of the invention will become apparent upon reading the following detailed description and upon reference to the drawings, in which.

While the invention will be described in connection with preferred procedures, it is to be understood that the following detailed description Is not intended to limit the invention to those procedures. On the contrary, it is intended to cover all alternatives, modifications, and equivalents that may be included within the spirit and scope of the invention.

DETAILED DESCRIPTION OF THE INVENTION

As is well-known, diffusion bonding is a process through which separate elements can be joined to form a single unitary mass. The quality of the bond and the parameters employed necessarily vary for each particular choice of material used.

The present invention is particularly directed to reactive metals which have surfaces that would be contaminated at the elevated temperatures required for both diffusion bonding and superplastic pre-forming, i.e., at the temperatures of 1700° F. to about 1900° F. depending on the specific alloy used.

The invention contemplates the application of diffusion bonding techniques to a stack of sheets of such reactive metals. In particular, the invention is especially suited for the monitoring and control of temperatures during diffusion bonding of a stack of sheets of titanium aluminide.

Figure 1:
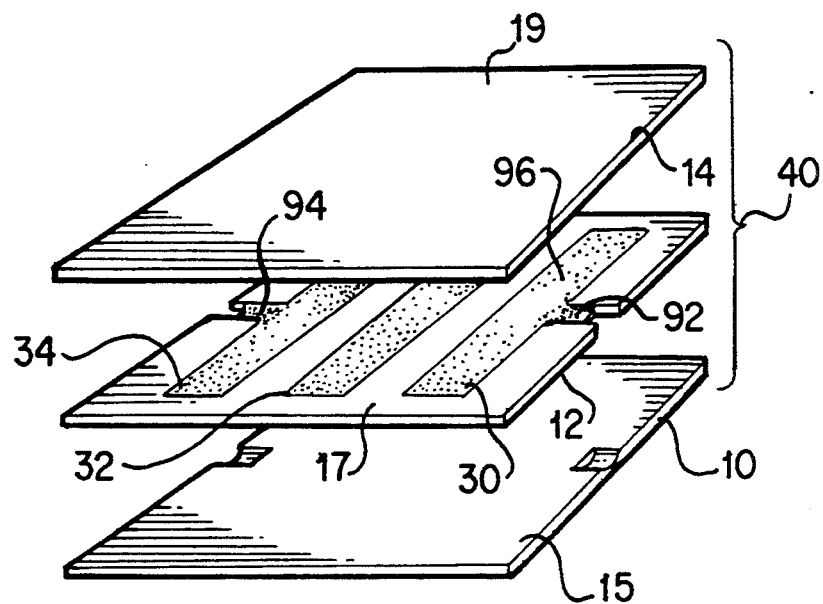
FIG. 1 is an exploded view of a three-piece metal sheet assembly or stack treated for selective diffusion bonding prior to insertion in the protective envelope.

FIG. 1 shows a typical stacked arrangement 40 of sheets of metal which have been prepared, by application of stop-off material at predetermined locations, for diffusion bonding prior to being formed into a sandwich structure. The stacked arrangement 40 includes three sheets 10, 12, 14 each having upper principal surfaces 15, 17, and 19, and lower principal surfaces opposite the upper surfaces (not numbered). Various areas of the sheets (see areas 30, 32, 34, 92 and 94) have been covered with stop-off material to prevent bonding at those locations.

The number of sheets used to form the stack varies with loading conditions and design requirements; however, a minimum of two sheets must be used. At least one of the sheets must exhibit superplastic properties, and of greatest interest are materials that exhibit superplastic properties within a temperature range required for diffusion bonding and that are subject to contamination at forming temperatures, as for example titanium aluminides. It is important to note that the forming temperature for such materials can be as great as 1800° F. The initial thickness of metal blanks 10, 12, 14 is determined as a function of the dimensions of the part to be formed.

The stack of metal sheets must be contained within an envelope or retort (as seen at 100 in FIG. 2) in order to prevent contamination by the environment in which the process of diffusion bonding is to take place. The retort is formed from two thin sheets of metal, fabricated from a material such as stainless steel. The sheets are of the same size and are disposed in face to face relationship and secured (as by welding) to one another about the peripheral edges of the sheets. Once the process of diffusion bonding of the stack has been completed, further treatment of the bonded assembly may be performed with the retort removed.

One process contemplated by the present invention is superplastic forming (SPF). The stop-off material applied to areas 92 and 94 prevent bonding of the sheets of the stack so that tubes used in the superplastic forming process can be inserted into the stack interior to permit introduction of cleansing gas or evacuation of the interior of the stack. Of course, if preferred, superplastic forming of the diffusion bonded stack of sheets can take place within the retort before its removal.

Figure 2:
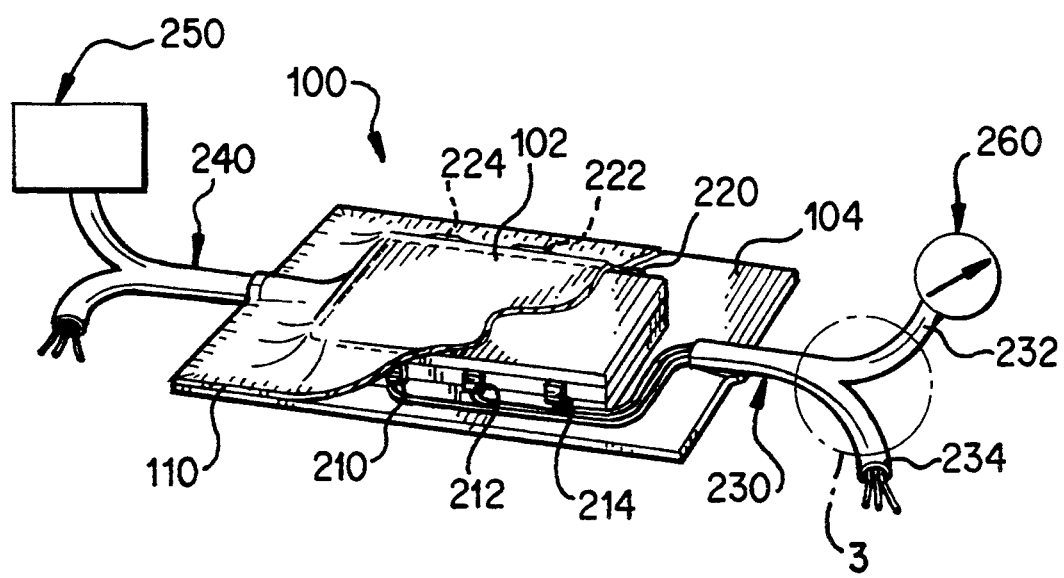
FIG. 2 is a perspective view showing the three-piece stack of FIG. 1 assembled within a retort which has been prepared for diffusion bonding.

FIG. 2 shows the workpiece sealed within retort 100 which comprises upper and lower sheets 102,104 of metal sealed to one another along their peripheral edges (shown at 110 in the FIG. 2 representation). Along opposing edges of the workpiece, within the retort, are disposed temperature monitoring devices at predetermined locations. These temperature monitoring instruments (discussed in more detail below) are used to measure the temperature which the stack edges have attained during the heating up process in advance of, and during, the gas pressure diffusion bonding process.

Relatively precise measurement and monitoring of temperature is important for both the success off the bonding process as well as for the subsequent metallurgical considerations of the part itself.

For example, if the temperature is too low, bonding will not occur in the predetermined time. Moreover, if the temperature is too high, metallurgical changes occur in the part, such as grain growth, which reduce material properties such as superplasticity. Accordingly, accurate measurement of temperature in as close proximity to the part as possible is necessary for successful SPF/DB manufacturing.

One of the greatest problems encountered in the past has been that during the heat-up phase of the diffusion bonding process, the edges of the stack are the last regions to attain the predetermined requisite temperature needed to carry out the process. Temperature measurement has typically been possible only in the environment surrounding the retort which at times is a considerable distance from the forming part itself. This results in significant differences in the actual part temperature and the measured temperature. Thus, measurement of temperature at predetermined locations at or adjacent the stack edges has not, heretofore, been considered as a technique for insuring precise control of heating and cooling cycles during the diffusion bonding process.

The present invention provides a cure for that problem, by allowing placement of thermocouples at the stack edges and within the retort.

In FIG. 2, a first set of thermocouples or similar temperature sensing devices 210, 212, 214 have been disposed at spaced locations along one edge of the stack, while a second set of thermocouples or similar temperature sensing devices 220, 222, 224 have been disposed at spaced locations along an opposite edge of the stack.

Although the thermocouples in FIG. 2 are shown as having been placed on opposite sides of the stack, it is to be understood that the present invention embraces the placement of such temperature sensing devices all around the perimeter of the stack, or at whatever locations about the stack would most accurately reflect the temperature gradient or distribution within the various sheets of the stack. While the embodiment depicted in this application includes two sets of three thermocouples, any number of thermocouples or similar devices can be used.

As shown in FIG. 2, the wires connected to the first set of thermocouples 210, 212, 214 extend from the inside of the retort to a tube 230 at one end of the retort, while the wires associated with the second set of thermocouples extend from the thermocouples inside the retort to a tube 240 at the opposite end of the retort.

Of course, the invention contemplates that the wires associated with both the first set and the second set of thermocouples could extend from the interior of the retort at the same single side thereof through the same tube (either tube 230 or tube 240). In this arrangement, the configuration of the tube would allow for application of a vacuum through one retort end with a vacuum gage at the opposite end merely to measure and/or record the vacuum level.

While tubes 230 and 240 are provided primarily for the purpose of connecting the interior of the retort with apparatus for placing the retort interior under a vacuum, they also enable temperature monitoring of the interior volume of the retort while the retort volume is under vacuum conditions, as well as prior to, during, and following the diffusion bonding process, To accomplish these ends, the tubes 230 and 240 are fabricated from a material which is strong enough to maintain their cylindrical configuration throughout the entire window of time during which a vacuum is impressed on the retort and then diffusion bonding pressures are applied to the retort. More particularly, tile tube 240 communicates vacuum pump 250 with the retort interior volume from the retort one end (the left hand side in FIG. 2), while the tube 230 communicates valving and metering apparatus 260 with the retort interior volume from the retort other end (tile right hand side in FIG. 2).

Figure 3:
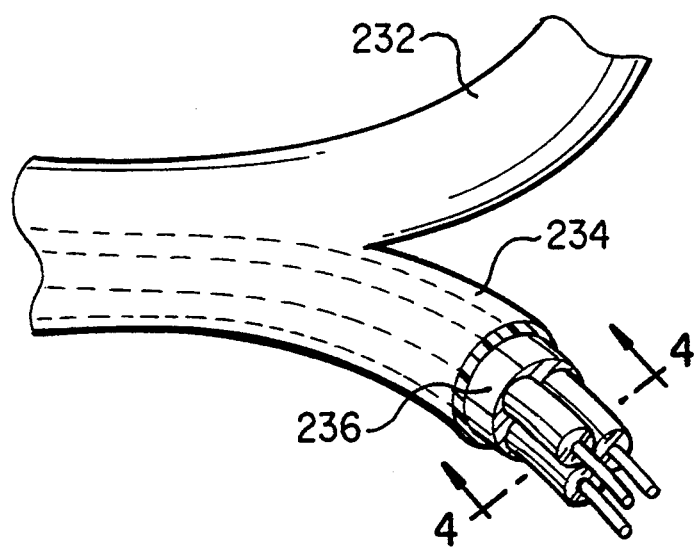
FIG. 3 is a perspective view of the branched end of tubing used with the present invention.

FIG. 3 is an enlarged view of a region of one of the tubes shown in the vicinity of the branched tube portions 232 and 234. Tube portion 232 is coupled with the vacuum equipment (the valving and metering apparatus 260) while tube portion 234 contains the thermocouple wires passing from within the retort to a point of connection with temperature measurement display apparatus (not shown) located outside of the retort.

Figure 4:
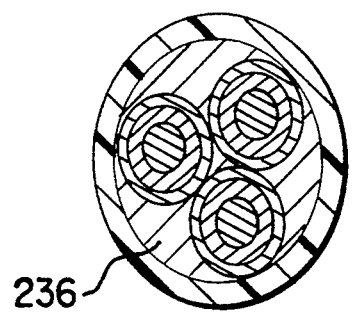
FIG. 4 is a cross sectional view of an end of one branch of the tubing shown in FIG. 3.

FIG. 4 is a cross-sectional view of the tube portion carrying the thermocouple wires (note FIG. 3) looking down into the tube portion from the end of the tube portion. As seen, there are three thermocouple wires disposed within the tube, the three wires being substantially snuggly engaged with one another and with the internal cylindrical surface of the tube. Each wire includes at least one inner conductor, an outer sheathing and a tube surrounding the outer sheathing, with the outer sheathing being swaged about the inner conductor. After the thermocouple wires are appropriately disposed within their respective tubes 232 and 234, the end of those tubes are sealed by means of brazing, as shown at 236 in FIGS. 3 and 4.

Since the temperature measurement system has become an integral part of the vacuum pumping system, it is necessary that the exit port of the thermocouples be leak tight. One method to achieve leak tightness is to flow an appropriate braze alloy between the sheaths of the thermocouples and the vacuum exit port tubing. If this method is used, the junction must be a sufficient distance from the heat source to prevent subsequent metal flow or melting.

The apparatus thus described facilitates the measurement of temperature-related parameters for a workpiece disposed in a sealed retort located within a diffusion bonding chamber so that a set of thermal control parameters can be established for use in effecting subsequent diffusion bonding operations. This is accomplished by strategically locating temperature measurement devices in a diffusion bonding process chamber on or adjacent the edges of a workpiece within the retort. While measuring the temperatures on or about the workpiece during the process, the relationship between the time over which the temperature is elevated and the temperatures at the specified locations is determined. This relationship is then used in the current process, as well as in subsequent processes, to control both the external temperature to which the retort is subjected (for elevating the workpiece to the target temperature) and the time at which the specified temperature is to be applied.

The apparatus embraced by the invention includes a metallic container or "retort" enveloping a workpiece prepared for diffusion bonding and temperature measuring apparatus including thermocouple devices strategically placed at locations on or about the workpiece. The retort consists of upper and lower metal sheets sealable at edges about the workpiece. Vacuum conduits communicate the sealed retort chamber with display and recording apparatus located outside the retort. Leads from the thermocouple devices run through the vacuum conduits to the apparatus. The vacuum conduits for the thermocouple leads are sealed to prevent ingress of contaminants into the retort during the diffusion bonding process. The temperatures on or about the workpiece are measured during the course of the diffusion bonding process, and the relationship between the time over which the temperature is elevated and the temperatures at the specified locations is recorded. This relationship is then used, in the current process as well as in subsequent processes, to control both the external temperature to which the retort is subjected and the time at which the specified temperature is to be applied.

While certain representative embodiments and details have been shown for the purpose of illustrating the invention, it will be apparent to those skilled in this art that various changes and modifications may be made therein without departing from the spirit or scope of this invention.

What I claim is:

1. A method for obtaining thermal parameters associated with a reactive metal workpiece disposed in a retort during diffusion bonding of the workpiece, where the parameters are used in carrying out subsequent diffusion bonding of similar workpieces, said method comprising:

(a) locating temperature measuring instruments in contact with various portions of said workpiece in said retort, and connecting conducting leads between said instruments and display devices located outside said retort, (b) providing conduit means for at least one end of said retort, each said conduit means communicating the interior of said retort with at least vacuum applying means, (c) disposing said conducting leads in said conduit means, (d) sealing said conduit means about said conducting leads, (e) impressing a vacuum on said retort while heating said retort and contents to a diffusion bonding temperature, (f) measuring the temperature at said various portions on said workpiece, (g) determining temperature related control parameters associated with the diffusion bonding process being carried out, and repeating steps (a)–(e) for each subsequent diffusion bonding process carried out in a retort for workpieces of similar materials, while controlling the temperature applied during said diffusion bonding process.

2. The method of claim 1, wherein said temperature measuring instruments comprise thermocouple devices, and said step of locating the thermocouple devices adjacent portions of said workpiece includes positioning said devices adjacent the edges of said workpiece.

3. The method of claim 1, wherein said retort comprises upper and lower sheets of metal, and said step of impressing a vacuum on said retort is preceded by a step of securing the upper and lower sheets to one another along their peripheral edges.

4. The method of claim 3, wherein said step of securing follows steps (a)–(d),

5. The method of claim 3, wherein said step of locating temperature measuring instruments in contact with portions of said workpiece in said retort comprises disposing said instruments atop said workpiece.

* * * * *